United States Patent [19]
Burns

[11] 3,788,194
[45] Jan. 29, 1974

[54] ACTUATOR UNIT
[75] Inventor: Louis G. Burns, Watertown, N.Y.
[73] Assignee: General Signal Corporation, Watertown, N.Y.
[22] Filed: June 30, 1972
[21] Appl. No.: 268,013

[52] U.S. Cl............................ 91/386, 91/1, 91/387, 91/459
[51] Int. Cl............................................. F15b 13/16
[58] Field of Search............... 91/387–380, 382–386

[56] References Cited
UNITED STATES PATENTS

| | | | |
|---|---|---|---|
| 2,610,614 | 9/1952 | Sedgewick | 91/382 |
| 2,811,138 | 10/1957 | Clements | 91/387 |
| 2,997,987 | 8/1961 | Eggenberger | 91/387 |
| 3,143,925 | 8/1964 | Wolpin | 91/387 |
| 3,608,432 | 9/1971 | Walton | 91/380 |
| 3,675,538 | 7/1972 | Keller | 91/387 |

Primary Examiner—Paul E. Maslousky
Attorney, Agent, or Firm—Harold S. Wynn

[57] ABSTRACT

The disclosure concerns a unitized, proportional, electro-pneumatic linear actuator having a pneumatic power motor controlled by a position balanced servo valve which is actuated directly by an electrical stepper motor. Preferably, the position feedback linkage interconnecting the power motor and the valve comprises a pivoted lever system including springs for eliminating backlash, and a gain adjustment.

9 Claims, 6 Drawing Figures

ACTUATOR UNIT

BACKGROUND AND SUMMARY OF THE INVENTION

The present trend toward computer controlled process plants has created a demand for powered actuators which are as sensitive and as precise as the controlling elements of the process loop. Since most actuators on the market today are controlled by a low pressure air signal, adaptation of these devices to electronic control is accomplished by incorporating a separate electro-pneumatic transducer which modulates the air signal supplied to the actuator in accordance with the electrical command. This approach, of course, introduces added expense and can be inconvenient because of the need for extra tubing. Moreover, these prior actuators generally employ a force balanced servo valve, which necessitates inclusion of delicate mechanisms, such as air bellows, calibrated metering springs, force-balancing linkages and orifice relays. Thus, positional errors attributable to friction can be a troublesome problem, and the apparatus is rather fragile.

An object of this invention is to provide an improved electro-pneumatic linear actuator which is free of the disadvantages mentioned above. According to the invention, the actuator takes the form of a unitized package including a servo valve which is actuated directly by an electrical stepper motor, and which is equipped with a position balancing system. The arrangement results in a compact actuator unit affording precise and reliable control action which is not affected by spring forces and friction. In the preferred embodiment, the unit utilizes a pivoting lever feedback link between the air motor and the servo valve which comprises a pair of bell cranks, and which incorporates simple means for adjusting the gain of the actuator. Moreover, this version also includes limit stops which effectively protect the apparatus from damage or binding resulting from excessive input signals or overtravel of the mechanical components.

BRIEF DESCRIPTION OF THE DRAWINGS

The preferred embodiment of the invention is described herein with reference to the accompanying drawings in which.

DESCRIPTION OF ILLUSTRATED EMBODIMENT

Figure 1:
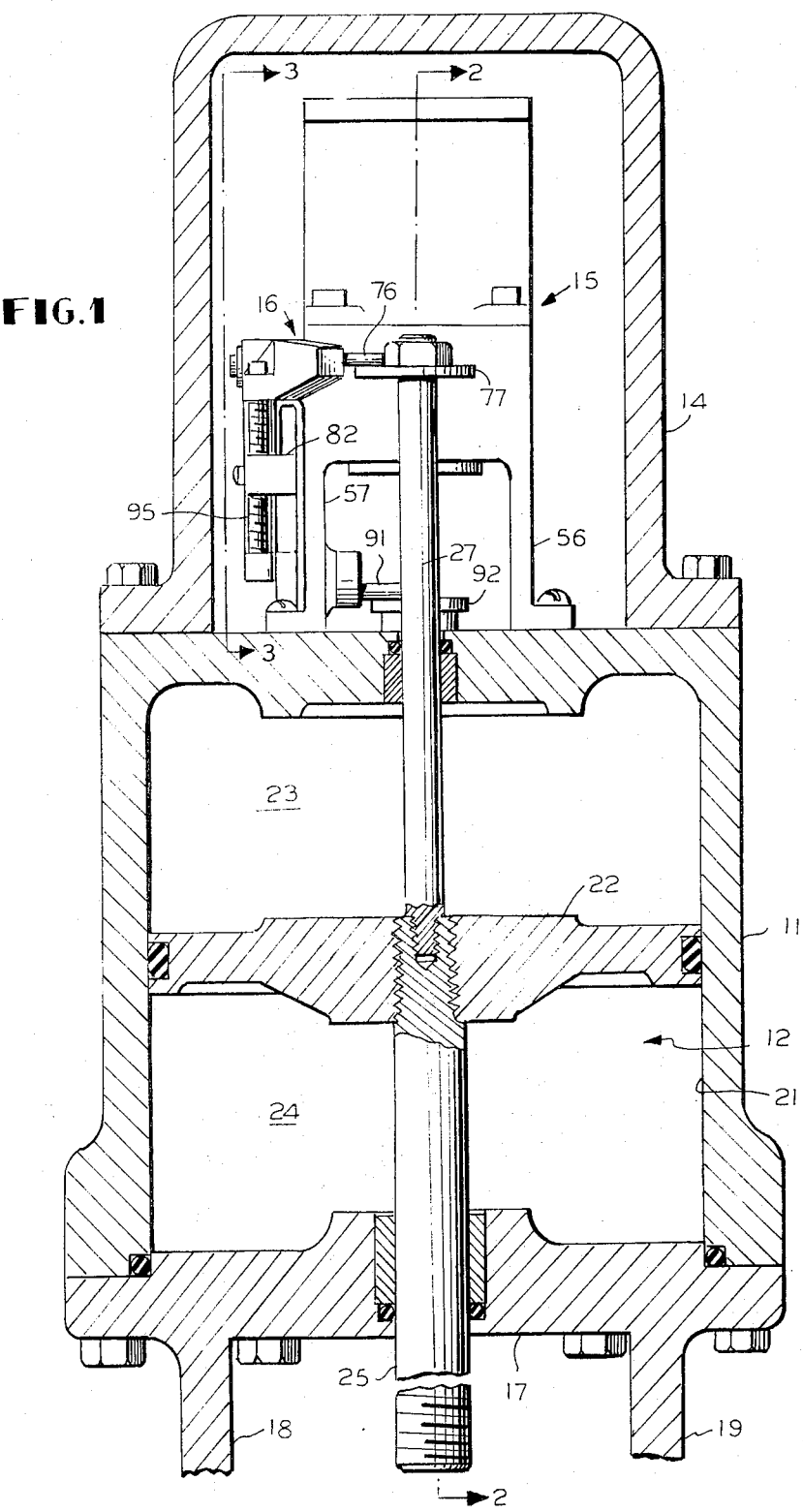
FIG. 1 is a sectional view of the actuator unit.
Figure 2:
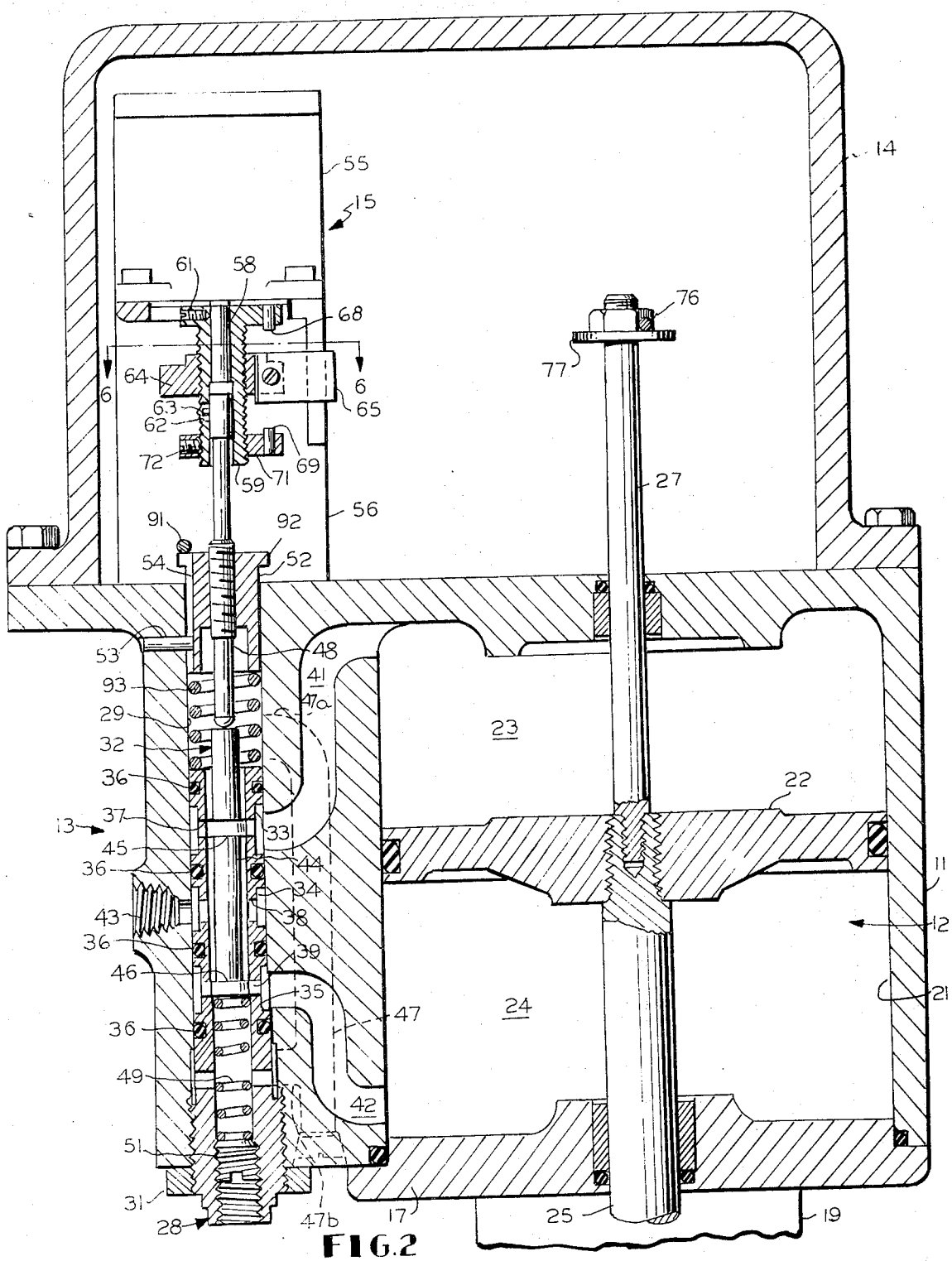
FIG. 2 is a sectional view taken on line 2—2 of FIG. 1.
Figure 3:
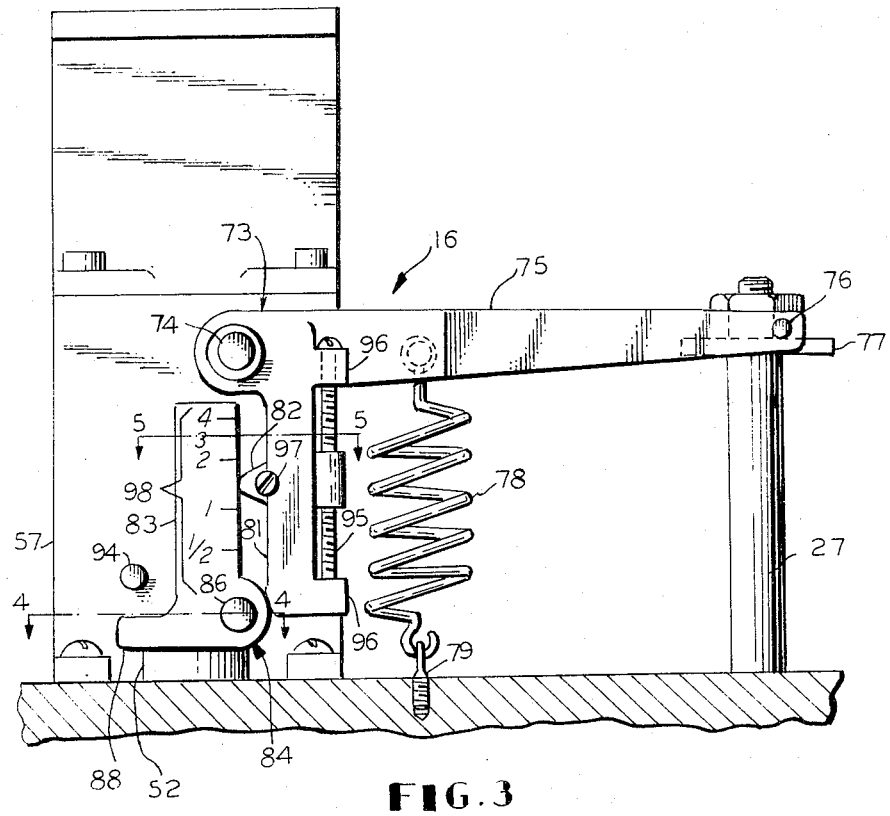
FIG. 3 is an enlarged sectional view taken on line 3—3 of FIG. 1.

Referring to FIGS. 1–3, the actuator unit comprises a multi-part casing including a main body 11 which contains a double-acting air motor 12 and a four-way servo valve 13, an upper cover 14 which encloses a stepper motor assembly 15 and feedback linkage 16, and a yoke 17 having integral depending legs 18 and 19 which terminate in a mounting pad (not shown). Air motor 12 includes a cylinder 21, a cooperating reciprocable double-acting piston 22 which divides the cylinder into opposed working spaces 23 and 24, an actuating stem 25 which is screwed into the piston, and a tail rod 27 which, in turn, is screwed into the end of stem 25. The lower end of stem 25 is either threaded or provided with a suitable coupling which enables it to be attached to a valve or other apparatus which is to be positioned.

As shown in FIG. 2, servo valve 13 comprises a ported sleeve 28 which is threaded into a bore 29 in main body 11 and locked in place by a jam nut 31, and a cooperating reciprocable spool 32. The sleeve 28 is formed with three axially spaced, peripheral grooves 33–35 which are isolated by four static o-ring seals 36, and each of which is connected with the interior of the sleeve through a set of radial passages 37, 38, or 39. Grooves 33 and 35 are in continuous communication with working spaces 23 and 24 via cored motor passages 41 and 42, respectively, whereas center groove 34 is in continuous registration with a supply port 43. Valve spool 32 is formed with a peripheral groove 44 and a pair of lands 45 and 46, each of which is wider than the radial passages 37 or 39 with which it is associated. Therefore, when the spool is in the illustrated null position, the lands block flow into and out of the passages. On the other hand, when spool 32 is shifted up or down from the null positon, groove 44 connects supply port 43 with one set of the passages 37 and 39, and the remaining set of passages is vented to atmosphere through either the branch 47a or the branch 47b of a cored exhaust passage 47.

Valve spool 32 is shifted by a lead screw actuator 48 which abuts its upper end and with which it is maintained in contact by a coil compression spring 49 seated on a plug 51 threaded into the lower end of sleeve 28. Actuator 48 is threaded into a flanged bushing 52 which reciprocates in bore 29 and is fixed against rotation by a pin 53 which projects into a longitudinal slot 54 formed in its outer surface.

Motor assembly 15 comprises a four-phase rotory stepper motor 55 which is mounted on a pair of vertical brackets 56 and 57 attached to the upper face of main body 11, and which has an output shaft 58 aligned with servo valve 13. Shaft 58 carries a torque-transmitting sleeve 59 which is fixed in place by a set screw 61 and contains a longitudinal slot 62 which receives a radial pin 63 carried by the upper end of lead screw actuator 48. The pin and slot define a slip joint which transmits torque to the lead screw while allowing it freedom to move longitudinally. The outer surface of sleeve 59 is threaded to receive a nut 64 to which is attached a flat plate 65 which projects radially through a vertical gap left between the end walls 66 and 67 of brackets 56 and 57 (see FIG. 6). Plate 65 can slide in the gap, but it cannot rotate; therefore, as shaft 58 rotates in opposite directions, nut 64 travels up or down along sleeve 59. Sleeve 59 carries a pair of stop pins 68 and 69 which cooperate with plate 65 to limit the rotary output motion of motor 55; the pin 68 being fixed in an integral flange at the upper end of sleeve 59, and the pin 69 being pressed into a collar 71 which is threaded onto the sleeve and locked in place by a set screw 72. The vertical spacing between pins 68 and 69 determines the range of motion of output shaft 58, since engagement of either pin with plate 65 precludes further rotation of the shaft in the same direction. In a typical case, motor 55 moves shaft 58 through an angle of 1.8° per input pulse, and the actuator unit is intended to accept 1000 pulses. Therefore, collar 71 is so adjusted that pins 68 and 69 allow five revolutions of shaft 58. The inclusion of this stop mechanism prevents damage to the remaining components of the actuator unit in cases where the motor is overpulsed (i.e., supplied with more than the number of pulses which the unit is intended to accept).

The electrical input to the actuator unit normally is in the form of a series of low voltage command pulses whose sense indicates the direction in which stem 25 is to be moved. Therefore, the complete assembly 15 includes control circuitry which amplifies the input signals and delivers the resulting power pulses to the four coils of motor 55 in the sequence required to effect rotation of output shaft 58 in the proper direction. Although the control circuits are not shown in detail, it is recommended that they be embodied in a plug-in unit, e.g., an electronic card or module, mounted within cover 14.

Whereas stepper motor 55 initiates movement of air motor piston 22 by causing actuator 48 to shift longitudinally relatively to bushing 52 and thereby displace spool 32 from null position, feedback linkage 16 serves to shift bushing 52 as required to restore the valve spool to null position when piston 22 has moved a distance porportional to the rotary output of motor 55. This linkage comprises a bell crank 73 which is journaled on a pivot 74 supported by bracket 57 and includes an arm 75 which is operatively connected with the piston 22 of air motor 12 through a pin 76 which bears against the upper face of a washer 77 attached to the end of tail rod 27. The pin and washer are maintained in engagement by a coiled tension spring 78 which reacts between arm 75 and a fitting 79 screwed into the upper face of main body 11. The other arm 81 of bell crank 73 is equipped with a sliding contact 82 whose nose bears against the adjacent arm 83 of a second bell crank 84. This crank 84 is fixed by a set screw 85 to a pin 86 which is journaled in a bearing supported by bracket 57 (see FIG. 4), and has a pair of additional arms 87 and 88. Arm 87 is attached to crank 84 through pin 86, to which it is locked by set screw 89, and carries a pin 91 which bears against the upper surface of the flange portion 92 of bushing 52. Contact between these parts is insured by a coil compression spring 93 which is seated on the upper end of valve sleeve 28. The other arm 88 of crank 84 is formed in one piece with arm 83 and cooperates with a stop pin 94 projecting from the side of bracket 57 to limit upward motion of bushing 52.

Figures 4, 5, 6:
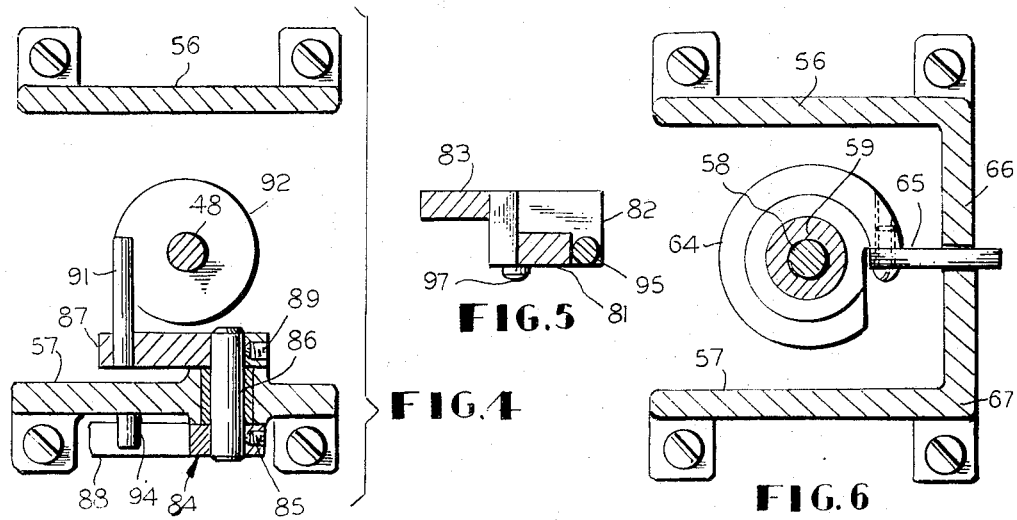
FIGS. 4 and 5 are sectional views taken on lines 4—4 and 5—5, respectively, of FIG. 3.
FIG. 6 is an enlarged sectional view taken on line 6—6 of FIG. 2.

As shown in FIGS. 3 and 5, sliding contact 82 is notched to fit crank arm 81 and is shifted along the arm by a parallel lead screw actuator 95 which is threaded through the contact and whose plain ends are journaled in lugs 96 formed on the crank 73. A screw 97, whose head overlaps the front face of arm 81, serves to lock contact 82 in the selected position. When screw 97 is loosened, lead screw 95 can be turned to shift contact 82 and vary in reverse senses the lengths of its moment arms with respect to the axes of crank pivots 74 and 86. This has the effect of varying the ratio of the angular movements of the two bell cranks 73 and 84. Consequently, the position of contact 82 determines the gain of the actuator unit (i.e., the distance piston 22 moves for each electrical pulse received by motor 55). Crank arm 83 is provided with a graduated scale 98 expressed in terms of inches of stroke of piston 22 as an aid to the user in adjusting the unit to afford the desired output motion for a given electrical input. The legends show in FIG. 3 indicate that the illustrated embodiment is capable of affording an output stroke between ½ and 3½ inches for an input of 1000 pulses.

The parts of the actuator unit are shown in the positions they assume under null conditions with the piston 22 in mid-stroke position. In order to extend stem 25, motor 55 is supplied with a series of pulses which causes it to rotate lead screw actuator 48 in the counterclockwise direction as viewed in FIG. 4. Since pin 53 prevents bushing 52 from rotating, actuator 48 now withdrawns from the bushing and allows spring 49 to move valve spool 32 up from the illustrated null position. As a result, air under pressure is delivered to working space 23 via port 43, groove 34, passages 38, spool groove 44, passages 37, groove 33 and cored passage 41, and working space 24 is vented to atmosphere through cored passage 42, groove 35, radial passage 39, branch 47b and passage 47. The difference between the pressures in spaces 23 and 24 moves piston 22 down and extends stem 25. As this movement proceeds, bell crank 73 pivots in the clockwise direction, (as viewed in FIG. 3) under the action of spring 78 and, through contact 82, causes counter-clockwise pivotal movement of crank 84. Therefore, pin 91 shifts bushing 52 and lead screw actuator 48 as a unit in the downward direction, and thereby moves valve spool 32 back toward the null position. Since the upward movement of actuator 48 caused by motor 55 is proportional to the number of pulses received, and the downward movement of bushing 52 caused by pin 91 is proportional to the movement of piston 22, it will be evident that spool 32 will be restored to the null position and halt motion of piston 22 when the change in position of the latter is proportional to the number of input pulses. The gain or factor of proportionality, of course, is determined by the setting of sliding contact 82.

As motor 55 is pulsed in the stem-extending direction, the rotary motion of shaft 58 and sleeve 59 causes nut 64 to descend. Therefore, when the motor has received the maximum number of pulses for which the unit is designed, pin 69 will engage plate 65 and prevent further movement of actuator 48 in the upward direction relatively to bushing 52. If the apparatus is properly adjusted, this stop will be rendered effective before actuator 48 has been withdrawn from bushing 52 an excessive amount, and just slightly before piston 22 reaches the limit of its travel and abuts yoke 17.

In order to retract stem 25, motor 55 is pulsed in the reverse sense, i.e., it is caused to rotate lead screw actuator 48 in the clockwise direction as viewed in FIG. 4. In this case, the lead screw moves into bushing 52 and shifts valve spool 32 down from the null position. This action allows compressed air to be delivered to working space 24 via port 43, groove 34, radial passages 38, spool groove 44, radial passages 39, groove 35 and cored passage 42, and vents working space 23 to the atmopshere via passage 41, groove 33, radial passages 37, branch 47a, and exhaust passage 47. The difference between the pressures in the two working spaces 23 and 24 forces piston 22 upward and causes washer 77 to pivot bell crank 73 in the counterclockwise direction, as viewed in FIG. 3. Since spring 93 acts on crank 84 through bushing 52 and pin 91, this crank now pivots in the clockwise direction about the axis of pivot 86 and allows the bushing and lead screw actuator 48 to move upward. Spring 49 forces valve spool 32 to follow movement of the actuator, so the spool now moves back toward its null position. As in the preceding mode of operation, the valve spool will reach null position and bring piston 22 to rest when the distance traveled by the piston corresponds to the electrical input (i.e., the number of pulses received by motor 55).

During the stem-retracting operation, rotation of output shaft 58 causes nut 64 to move upward along sleeve 59. Thus, when the motor has been pulsed the maximum amount for which the apparatus is designed, pin 68 will engage plate 65 and prevent further rotation. Proper adjustment insures that this happens just before crank arm 88 engages stop pin 94 or piston 22 reaches the limit of its upward motion.

The proper adjustment of the apparatus referred to above requires the arm 75 of bell crank 73 be in a horizontal position when piston 22 is in the mid-stroke position. This condition is established initially by the manufacturer, but can be checked and re-established during service in the following manner: Motor 55 is pulsed in one direction until pin 68 engages plate 65, and is then driven in the reverse direction by one-half of the maximum number of pulses for which the unit is designed (e.g., 500 pulses in the example mentioned previously). This action brings lead screw actuator 48 to mid-stroke position. Cover 14 is now removed and the position of arm 75 noted. If it is not horizontal, jam nut 31 is loosened, and valve sleeve 28 is turned in the direction required to effect the desired compensating movement of piston 22. In cases where arm 75 is tilted down, sleeve 28 is turned in the clockwise direction so that it moves up relatively to spool 32 and thereby causes working spaces 23 and 24 to be vented and pressurized, respectively. As a result, piston 22 moves up and, through washer 77 and pin 76, pivots crank 73 to the desired orientation. On the other hand, if arm 75 is tilted up from the horizontal, sleeve 28 is turned in the opposite direction so that its moves down relatively to spool 32. In this case, space 23 is pressurized and space 24 is vented. As a result, piston 22 moves down, and spring 78 pivots crank 73 to the desired position.

The design of the preferred embodiment provides for replacement and servicing of the major components with a minimum of time and effort. For example, servo valve 13 can be removed from the unit by merely loosening jam nut 31 and unscrewing sleeve 28 from body 11. Stepper motor assembly 15 and feedback linkage 16 may be withdrawn as a unit by removing cover 14, detaching spring 78 from its seat 79, and removing the mounting bolts which hold brackets 56 and 57 to main body 11. The piston and stem seals of air motor 12 can be serviced by detaching yoke 17 and cover 14 from main body 11, removing washer 77 from tail rod 27, and then withdrawing piston 22 from cylinder 21. In each instance, removal of the component group requiring servicing is accomplished without disturbing the other major groups.

It should be evident from the preceding description that while the disclosed actuator unit does incorporate three springs 49, 78 and 93, these components serve merely to insure positive seating of the mechanical parts and eliminate backlash; they do not determine the position of the servo valve. The air motor 12 may also include a biasing spring which acts to move stem 25 to a prescribed position in the event that supply of motive air is interrupted, but here too the spring would play no position-determining role during normal operation.

I claim:
1. An actuator unit comprising;
   a. a fluid pressure motor including a reciprocable piston;
   b. a servo valve including a spool movable in opposite directions from a null position to control motive fluid flow to and from the motor;
   c. an electrical stepper motor having an output shaft which rotates in discrete steps in opposite directions in response to electrical pulses received by the motor;
   d. actuating means for shifting the spool including a lead screw actuator which is aligned with the spool and is threaded into a bushing which is fixed against rotation but reciprocates in the same direction as the spool;
   e. connection means for transmitting torque from the output shaft to the lead screw actuator without precluding linear motion of the latter; and
   f. pivoted lever feedback means for positioning the bushing in response to movement of the piston to thereby set the spool to null position when correspondence between piston motion and motion of the output shaft has been effected.

2. An actuator unit according to claim 1 in which the feedback means comprises;
   a. piston and bushing bell cranks pivoted on parallel axes and each having an arm positioned adjacent one arm of the other, the remaining arms of the piston and bushing cranks being operatively connected with the piston and the bushing, respectively; and
   b. force-transmitting means associated with said adjacent arms for causing the bushing crank to pivot an amount proportional to the pivotal movement of the piston crank.

3. An actuator unit according to claim 2 in which the force-transmitting means is adjustable to permit its moment arms with respect to the two pivot axes to be varied in reverse senses, whereby the ratio of piston movement to bushing movement can be varied.

4. An actuator unit according to claim 3 in which;
   a. the operative connection between the piston crank and the piston comprises cooperating members carried, respectively, by these parts and held in abutment by a first biasing spring, whereby the piston crank is moved positively by the piston in one direction and is caused by the spring to follow piston movement in the opposite direction;
   b. the operative connection between the bushing crank and the bushing comprises cooperating members carried, respectively, by these parts and held in abutment by a second biasing spring, whereby the bushing is moved positively by the bushing crank in one direction and is caused by the spring to follow crank movement in the opposite direction; and
   c. the spool is biased by a third spring into abutment with the lead screw actuator, whereby the spool is moved positively by the actuator in one direction and is caused by the spring to follow actuator movement in the opposite direction.

5. An actuator unit according to claim 4 in which;
   a. the servo valve includes a ported non-rotary sleeve with which the spool cooperates in controlling flow of fluid to and from the motor and which is adjustable in the axial direction; and b. the third spring reacts between the ported sleeve and the spool.

6. An actuating unit according to claim 2 including;
a first stop means for limiting pivotal motion of the bell cranks; and
b. second stop means for limiting rotary motion of the output shaft.

7. An actuating unit according to claim 6 in which the second stop means comprises;
a. a lead screw coaxial with and rotated by the output shaft;
b. a traveling nut threaded onto the lead screw and constrained against rotation;
c. a pair of stop elements fixed to rotate with the output shaft and spaced longitudinally along the lead screw; and
d. a reaction member carried by the traveling nut and arranged to engage the stop elements.

8. An actuator unit according to claim 5 in which the force-transmitting means includes cooperating elements carried by the piston and bushing bell cranks and which are held in abutment by spring bias.

9. An actuator unit according to claim 8 in which;
a. one of the cooperating elements is a block slidable along said adjacent arm of the piston crank, and the other element is a surface of the adjacent arm of the bushing crank which is engaged by a portion of the block;
b. the block is threaded onto a lead screw which is parallel with the adjacent arm of the piston crank and is supported for rotation by that crank; and
c. the force-transmitting means includes clamping means for locking the block to the adjacent arm of the first crank.

* * * * *